United States Patent
Niki

(10) Patent No.: US 8,767,538 B2
(45) Date of Patent: Jul. 1, 2014

(54) RADIO COMMUNICATION SYSTEMS, BASE STATIONS, RADIO COMMUNICATION METHODS, AND PROGRAMS

(75) Inventor: Takeo Niki, Tokyo (JP)

(73) Assignee: Nec Corporation, Tokyo (JP)

( * ) Notice: Subject to any disclaimer, the term of this patent is extended or adjusted under 35 U.S.C. 154(b) by 158 days.

(21) Appl. No.: 13/124,676

(22) PCT Filed: Nov. 12, 2009

(86) PCT No.: PCT/JP2009/069238
§ 371 (c)(1),
(2), (4) Date: Jun. 27, 2011

(87) PCT Pub. No.: WO2010/073843
PCT Pub. Date: Jul. 1, 2010

(65) Prior Publication Data
US 2011/0255435 A1 Oct. 20, 2011

(30) Foreign Application Priority Data
Dec. 22, 2008 (JP) .................. 2008-325449

(51) Int. Cl.
*H04W 24/00* (2009.01)
*H04W 4/00* (2009.01)
(52) U.S. Cl.
USPC ............ 370/230; 370/236.1; 370/329
(58) Field of Classification Search
None
See application file for complete search history.

(56) References Cited

U.S. PATENT DOCUMENTS

2006/0056451 A1* 3/2006 Yano et al. ............... 370/468

FOREIGN PATENT DOCUMENTS

| CN | 101159978 A | 4/2008 |
|---|---|---|
| JP | 2003259447 A | 9/2003 |
| JP | 2007266719 A | 10/2007 |
| JP | 2008193648 A | 8/2008 |
| JP | 2008252514 A | 10/2008 |
| WO | 2008041291 A | 4/2008 |
| WO | 2008/084693 A1 | 7/2008 |

OTHER PUBLICATIONS

International Search Report for PCT/JP2009/069238 mailed Dec. 8, 2009.
Chinese Office Action for CN Application No. 200980150202.1 issued on Jun. 21, 2013 with English Translation.

* cited by examiner

*Primary Examiner* — Huy D Vu
*Assistant Examiner* — Teisha D Hall
(74) *Attorney, Agent, or Firm* — Sughrue Mion, PLLC

(57) ABSTRACT

A base station according to the present invention includes a decision unit that computes an allowable throughput of each terminal for each of combinations of modulation systems and code rates in the case in which the base station accommodates a predetermined accommodation number of terminals in advance, compares a minimum reserved traffic rate of the terminal that is the control target and the allowable throughput, and decides a minimum physical rate at which the bandwidth is reserved based on the compared results; and a control unit that executes the control for the terminal that is the control target postulating that the adaptive modulation is executed for the terminal that is the control target at the minimum physical rate decided by the decision unit.

9 Claims, 6 Drawing Sheets

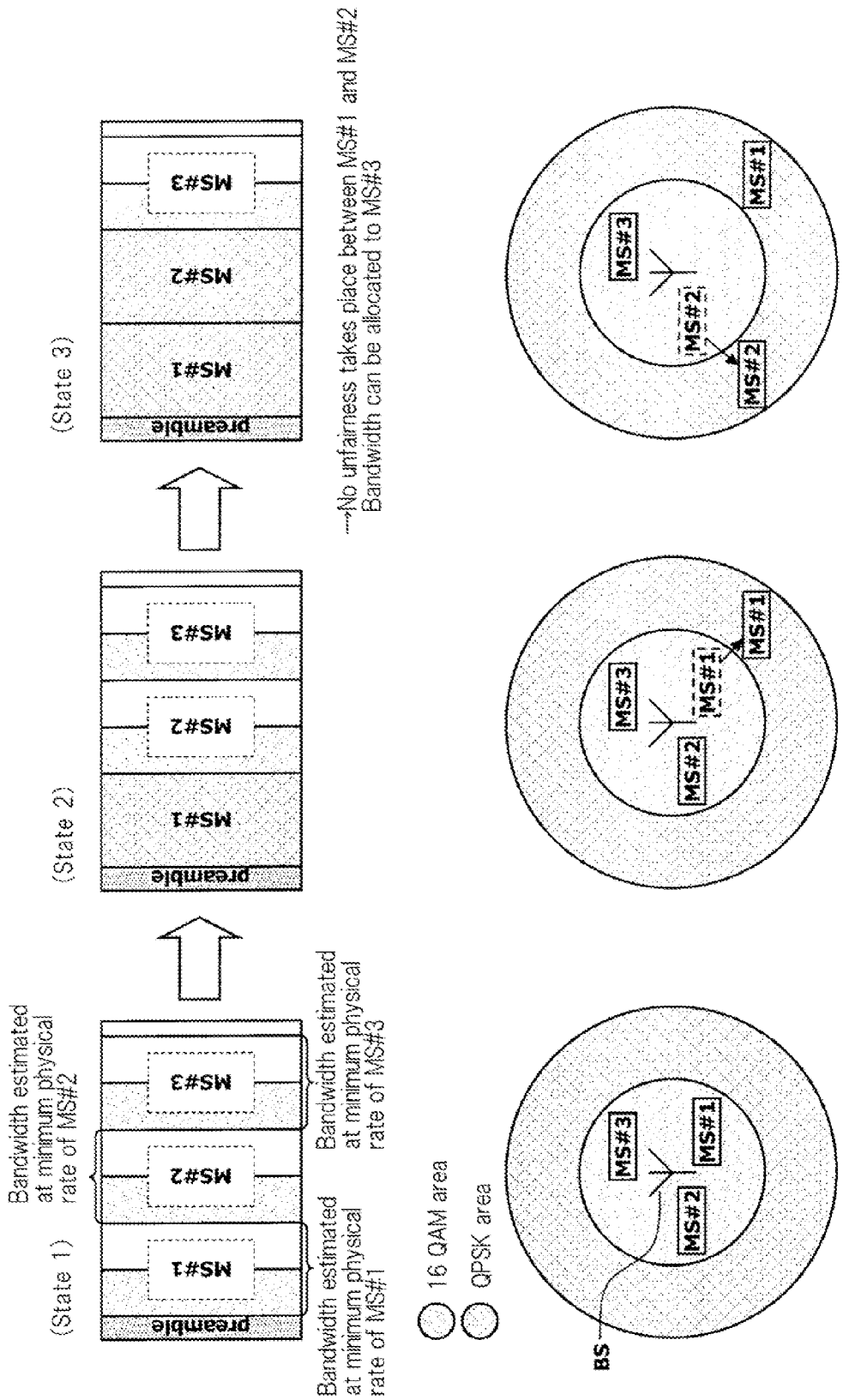

Fig.7

Method that decides minimum physical rate (Conditions)
· Frequency bandwidth = 10 MHz
· Estimated accommodation number of MSs = 4 units
· Ratio of DL : UL = 29 : 18
· Minimum reserved traffic rate = 1 Mbps (DL), 500 kbps (UL)
· Number of allocatable bytes/slot = A

|  |  | DL | UL |
|---|---|---|---|
| Number of usable slots | | 390 | 175 |
| Maximum number of slots per MS | | 97 | 43 |
| Allowable throughput | QPSK 1/2  (A=6) | 931200 | 412800 |
| | QPSK 3/4  (A=9) | 1396800 | 619200 |
| | 16QAM 1/2 (A=12) | 1862400 | 825600 |
| | 16QAM 3/4 (A=18) | 2793600 | 1238400 |
| | 64QAM 2/3 (A=24) | 3724800 | — |
| | 64QAM 3/4 (A=27) | 4190400 | — |
| | 64QAM 5/6 (A=30) | 4656000 | — |

→ Bandwidth can be reserved when physical rate of QPSK 3/4 is minimum physical rate for both DL/UL

RADIO COMMUNICATION SYSTEMS, BASE STATIONS, RADIO COMMUNICATION METHODS, AND PROGRAMS

The present application is the National Phase of PCT/JP2009/069238, filed Nov. 12, 2009, which claims a priority based on Japanese Patent Application JP 2008-325449 filed on Dec. 22, 2008, the entire contents of which being incorporated herein by reference in its entirety.

TECHNICAL FIELD

The present invention relates to radio communication systems, base stations, radio communication methods, and programs.

BACKGROUND ART

In the WiMAX (Worldwide Interoperability for Microwave Access) Forum, the WiMAX System Profile has been established on the basis of the IEEE (Institute of Electrical and Electronic Engineers) 802.16 standard. A WiMAX radio communication system is disclosed, for example, in Patent Literature 1.

In the WiMAX radio communication system, data are transmitted and received on the basis of every sub-frame, the OFDMA (Orthogonal Frequency Division Multiple Access) system is used as a multi-access connection system, and the TDD (Time Division Duplex) system is used as a duplex system.

The OFDMA system is a system that divides a frequency domain into sub-channels and a time domain into symbols and allocates bandwidths as slots that represent the divided domain to MSs (Mobile Stations).

The TDD system is a system that switches between a DL sub-frame and a UL sub-frame on the time domain using the same frequency for a DL (Down Link) and a UL (Up Link) between a BS (Base Station) and an MS.

In this part, with reference to FIG. 1, a frame structure of the WiMAX radio communication system will be briefly described.

Referring to FIG. 1, in the frame structure of the WiMAX, DL sub-frames and UL sub-frames are switched on the time domain (TDD system). Provided between a DL subframe and a UL subframe that are adjacent to are gap times referred to as a TTG (Transmit/Receive Transition Gap) and an RTG (Receive/Transmit Transition Gap).

In the DL sub-frame and the UL sub-frame, bandwidths are allocated as slots to MSs and data are transmitted thereto using the allocated bandwidths (OFDMA system).

Provided at the beginning of the DL sub-frame is a Preamble region including a Pilot signal, followed by a MAP region and so forth that include a signal that denotes what slots of the DL sub-frame and the UL sub-frame have been allocated to each MS. They are followed by regions (DL Bursts) that are allocated to each MS as a bandwidth for which DL data are transmitted.

On the other hand, provided at the beginning of the UL sub-frame are an Ranging region and so forth that include a Ranging signal that executes Ranging for adjustment of timing, frequency, and power on the MS side. They are followed by regions (UL Bursts) allocated to each MS as a bandwidth for which UL data are transmitted.

Moreover, the WiMAX radio communication system deals with an adaptive modulation system. The adaptive modulation system is a system that adaptively changes modulation systems and code rates of DL data and UL data between the BS and each MS depending on the propagation environment of each MS. Furthermore, in the WiMAX, data transmission speed according to a combination of a modulation system and a code rate has been specified and this data transmission speed is referred to as the physical rate.

In addition, the WiMAX radio communication system deals with a QoS (Quality of Service) class. In other words, the WiMAX radio communication system reserves bandwidths for MSs that belong to a particular QoS class such as the UGS (Unsolicited Grant Service), the ERT-VR (Extended Real Time-Variable Rate Service), the RT (Real Time)-VR, or the NRT (Non Real Time)-VR.

In this part, with reference to FIG. 2, an adaptive modulation operation for an MS that belongs to a QoS class that necessitates reservation of a bandwidth in this WiMAX radio communication system will be described.

In FIG. 2, the lower illustrations represent the relationship of positions of the BS and MS#1~MS#3 that belong to a QoS class that necessitates reservation of bandwidths, whereas the upper illustrations represent a DL sub-frame that is transmitted from the BS to the MS#1~MS#3 in the state that the relationship of positions shown in the lower illustrations is satisfied (these conditions apply to FIG. 3 and FIG. 6).

Referring to FIG. 2, it is assumed that the MS#1~MS#3 are located close to the BS, that is the center of the cell, in the initial state (state 1).

When an MS is located close to the center of the cell, data can be transmitted at a high physical rate. Thus, in state 1, the BS applies, for example, a 16 QAM (Quadrature Amplitude Modulation) 3/4 (the first part represents a modulation system, whereas the second part represents a code rate; these conditions apply to the description that follows) having a high physical rate as a combination of a modulation system and a code rate for the MS#1~MS#3. In the following, an area to which the 16 QAM 3/4 is applied is referred to as the 16 QAM area.

The number of slots that necessitates reservation of a bandwidth depends on the physical rate such that the lower the physical rate is, the more the number of slots is required. In state 1, since the 16 QAM 3/4 that applies to the MS#1~MS#3 has a high physical rate, the number of slots that necessitates reservation of bandwidths for the MS#1~MS#3 is small. Thus, the BS can accommodate all the MS#1~MS#3 and the free space of the bandwidth of the DL sub-frame becomes large.

Then, it is assumed that the MS#1 has exited from the 16 QAM area and has moved toward the edge direction of the cell (state 2).

Then, the BS performs the adaptive modulation for the MS#1 so as to apply, for example, a QPSK (Quadrature Phase Shift Keying) 1/2 having a low physical rate as a combination of a modulation system and a code rate for the MS#1. Hereinafter, the area to which the QPSK 1/2 applies is referred to as the QPSK area. On the other hand, since the QPSK 1/2 that applies to the MS#1 is at a low physical rate, the number of slots that necessitates reservation of a bandwidth for the MS#1 increases.

However, since the free space of the bandwidth of the DL sub-frame is large in state 1, even if the number of slots that necessitates reservation of the bandwidth for the MS#1 increases, the BS can still accommodate all the MS#1~MS#3. However, since the MS#1 occupies the bandwidth of the DL sub-frame, it's free space becomes small.

Then, it is assumed that the MS#2 has moved from the 16 QAM area to the QPSK area (state 3).

Then, the BS performs the adaptive modulation for the MS#2 so as to apply the QPSK 1/2 having a low physical rate as a combination of a modulation system and a code rate of the MS#2.

However, since the free space of the bandwidth of the DL sub-frame is small in state 2, the BS cannot allocate a bandwidth according to the physical rate of the QPSK 1/2 to the MS#2, resulting in a drop of the physical rate of the MS#2. On the other hand, since there are no slots that can be allocated to the MS#3, the BS cannot allocate slots to the MS#3 until the next sub-frame occurs.

Thus, in the WiMAX radio communication system, to solve the foregoing problem, the BS can perform a control referred to as the Admission Control. The Admission Control is a reception control for the adaptive modulation such that the BS deals with an MS that belongs to a QoS class that necessitates reservation of a bandwidth in MSs for which the BS executes the adaptive modulation and determines whether or not the BS can accommodate MS when executing the adaptive modulation for MS. The BS does not change the physical rate of MSs for which the BS has determined that it cannot accommodate MSs.

In this part, with reference to FIG. 3, an adaptive modulation operation that involves the Admission Control for MSs that belong to a QoS class that necessitates reservation of bandwidths in the WiMAX radio communication system will be described. The relationship of positions in the lower illustrations shown in FIG. 3 is the same as that shown in FIG. 2.

Referring to FIG. 3, it is assumed that the MS#1~MS#3 are located in the 16 QAM area in the initial state like the case shown in FIG. 2 (state 1). At this point, bandwidths have been allocated to the MS#1~MS#3 like the case shown in FIG. 2 and the free space of the bandwidth of the DL sub-frame becomes large.

Then, it is assumed that the MS#1 has moved from the 16 QAM area to the QPSK area (state 2)

Then, the BS executes the Admission Control for the MS#1 so as to determine whether or not the BS can allocate a bandwidth according to the physical rate of the QPSK 1/2 to the MS#1 when executing the adaptive modulation for the MS#1 according to the QPSK 1/2. At this point, since the free space of the bandwidth of the DL sub-frame is large in state 1, the BS determines that it can allocate a bandwidth to the MS#1 and accommodate the MS#1. Thus, the BS accommodates all the MS#1~MS#3 even in state 2. However, since the MS#1 occupies the bandwidth of the DL sub-frame, it's free space becomes small.

Then, it is assumed that the MS#2 has moved from the 16 QAM area to the QPSK area (state 3).

Then, the BS executes the Admission Control for the MS#2 like the case of the MS#1. However, since the free space of the bandwidth of the DL sub-frame is small in state 2, the BS determines that it cannot allocate a bandwidth to the MS#2. Thus, communication errors frequency occur in the MS#2 that cannot use an appropriate physical rate and exits from the entry of the BS. In this case, since the priority of the MS#2 is the same as that of the MS#1, unfairness take place.

RELATED ART LITERATURE

Patent Literature

Patent Literature 1: JP2007-266719A

SUMMARY OF THE INVENTION

Problem to be Solved by the Invention

As described above, in the WiMAX radio communication system, it was postulated that the BS executed the Admission Control according to the QPSK 1/2 that has the lowest physical rate uniformly for all MSs.

Thus, as a problem of the related art, if a certain MS is located at the edge of a cell, although a bandwidth according to the QPSK 1/2 that has the lowest physical rate can be reserved, a service postulated on the basis of a physical rate greater than the QPSK 1/2 cannot be provided.

In addition, since it is postulated that the system is operated according to the QPSK 1/2 having the lowest physical rate, if an MS that necessitates a high physical rate is accommodated, even if the Admission Control is executed, since bandwidths for the remaining MSs are restricted and thereby the adaptive modulation cannot be performed for them. Thus, as another problem of the related art, unfairness such as exiting from the entry may take place.

Therefore, an object of the present invention is to provide radio communication systems, base stations, radio communication methods, and programs that can solve the foregoing problems.

Means that Solve the Problem

A radio communication system according to the present invention is a radio communication system having a terminal and a base station that executes a control that determines whether or not said base station can accommodate a terminal that is the control target, from among terminals for which said base station executes an adaptive modulation that adaptively changes combinations of modulation systems and code rates, that belongs to a QoS (Quality of Service) class that necessitates reservation of a bandwidth when said base station execute said adaptive modulation, wherein said base station includes:

a decision unit that computes an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and a control unit that executes said control for said terminal that is the control target postulating that the adaptive modulation is executed for said terminal that is the control target at the minimum physical rate decided by said decision unit.

A base station according to the present invention is a base station that executes a control that determines whether or not said base station can accommodate a terminal that is the control target, from among terminals for which said base station executes an adaptive modulation that adaptively changes combinations of modulation systems and code rates, that belongs to a QoS class that necessitates reservation of a bandwidth when said base station execute said adaptive modulation, wherein said base station includes:

a decision unit that computes an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and a control unit that executes said control for said terminal that is the control target postulating that the adaptive modulation is executed for said terminal that is the control target at the minimum physical rate decided by said decision unit.

A radio communication method according to the present invention is a radio communication method for a base station that executes a control that determines whether or not said base station can accommodate a terminal that is the control target, from among terminals for which said base station executes an adaptive modulation that adaptively changes combinations of modulation systems and code rates, that belongs to a QoS class that necessitates reservation of a bandwidth when said base station execute said adaptive modulation, comprising:

a decision step that computes an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and a control step that executes said control for said terminal that is the control target postulating that the adaptive modulation is executed for said terminal that is the control target at the minimum physical rate that has been decided.

A program according to the present invention is a program that causes a base station that executes a control that determines whether or not said base station can accommodate a terminal that is the control target, from among terminals for which said base station executes an adaptive modulation that adaptively changes combinations of modulation systems and code rates, that belongs to a QoS class that necessitates reservation of a bandwidth when said base station execute said adaptive modulation to execute procedures, comprising:

a decision procedure that computes an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and a control procedure that executes said control for said terminal that is the control target postulating that the adaptive modulation is executed for said terminal that is the control target at the minimum physical rate that has been decided.

Effect of the Invention

According to the present invention, it is postulated that a control, that determines whether or not a terminal that is the control target that belongs to a QoS class that necessitates reservation of a bandwidth can be accommodated in an own station when an adaptive modulation is executed for the terminal that is the control target, is based on a minimum physical rate according to a minimum reserved traffic rate of the terminal that is the control target.

Thus, as an effect, for the terminal that is the control target, a bandwidth according to the minimum physical rate based on the minimum reserved traffic rate is reserved and a service postulated on the basis of the minimum reserved traffic rate can be provided.

In addition, since it is postulated that the control is executed at the minimum physical rate according to the minimum reserved traffic rate of the terminal that is the control target, when a terminal that necessitates a high physical rate is accommodated, even if the control is executed, the terminal that is the control target can be prevented from occupying a bandwidth.

BRIEF DESCRIPTION OF DRAWINGS

FIG. 6 is a schematic diagram describing an exemplary adaptive modulation operation in the radio communication system shown in FIG. 4.

FIG. 7 is a schematic diagram describing an exemplary minimum physical rate decision method in a minimum physical rate decision unit shown in FIG. 4.

MODES THAT CARRY OUT THE INVENTION

In the following, with reference to drawings, a preferred embodiment that carries out the present invention will be described.

In the following embodiment, although a radio communication system that is a WiMAX radio communication system will be exemplified, it should be noted that the present invention is not limited thereto.

Figure 4:
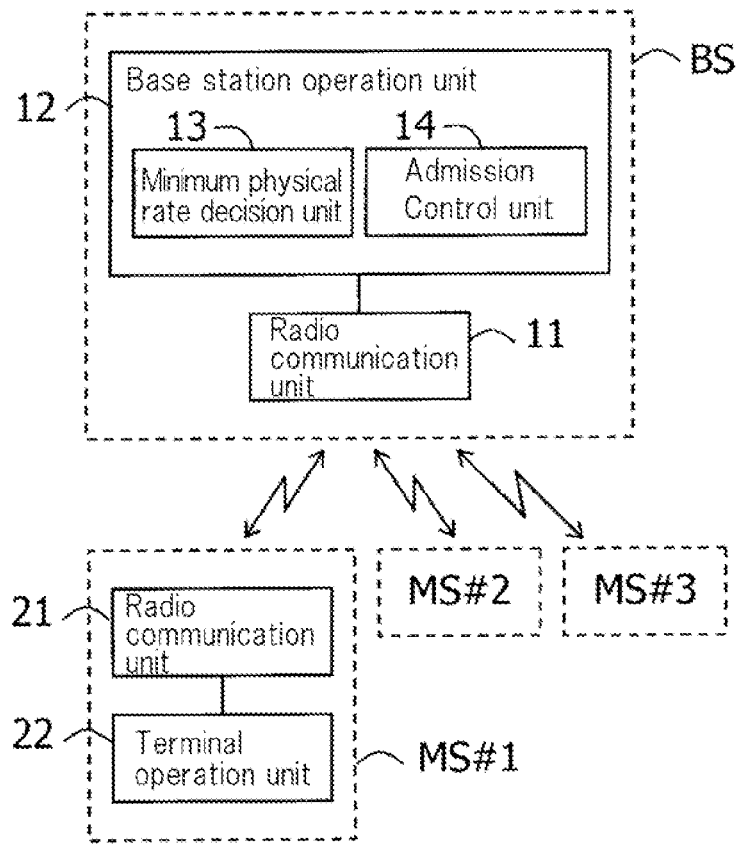
FIG. 4 is a block diagram showing a structure of a radio communication system according to an embodiment of the present invention.

As shown in FIG. 4, the radio communication system according to this embodiment has a BA that is a base station and MS#1~#3 that are terminals. In FIG. 4, for simple explanation, it is assumed that the number of BS and the number of MSs are one and three, respectively; however, the present invention is not limited by this assumption. In addition, it is also assumed that the MS#1~#3 are terminals that belong to a QoS class that necessitates reservation of bandwidths.

The BS has radio communication unit 11 and base station operation unit 12.

Radio communication unit 11 performs radio communication with the MS#1~#3.

Base station operation unit 12 has minimum physical rate decision unit 13 and Admission Control unit 14 that functions as a control unit.

Minimum physical rate decision unit 13 decides the minimum physical rate that is the minimum physical rate at which bandwidths are reserved for the MS#1~#3. The method that decides the minimum physical rate will be described later.

Postulating that the adaptive modulation is executed for an MS under control that belongs to a QoS that necessitates reservation of a bandwidth in those for which the adaptive modulation is executed at the minimum physical rate decided by minimum physical rate decision unit 13, Admission Control unit 14 executes the Admission Control that determines whether or not the BS can accommodate the MS under control.

Specifically, when a bandwidth according to the minimum physical rate decided by minimum physical rate decision unit 13 can be allocated to the MS under control, Admission Control unit 14 determines that the BS can accommodate the MS under control.

In addition, base station operation unit 12 has the same means (not shown) as does a BS that is used in a WiMAX radio communication system. These means include, for example, a means that executes a network entry process with the MS#1~#3 and a means that generates a service flow with the MS#1~#3. However, since such means are not essential parts of the present invention and can be accomplished by known means, their detailed description will be omitted.

The MS#1 has radio communication unit 21 and terminal operation unit 22. Likewise, the MS#2 and #3 have the same means (not shown) as does the MS#1.

Radio communication unit 21 performs radio communication with the BS.

Terminal operation unit 22 has the same means (not shown) as does an ordinary MS used in a WiMAX radio communication system. These means include, for example, a means that executes a network entry process with the BS and a means that generates a service flow with the BS. However, since such means are not essential parts of the present invention and can be accomplished by known means, their detailed description will be omitted.

In the following, an operation of the radio communication system according to this embodiment will be described.

[Operation Performed until Service Flow is Generated]

Figure 5:
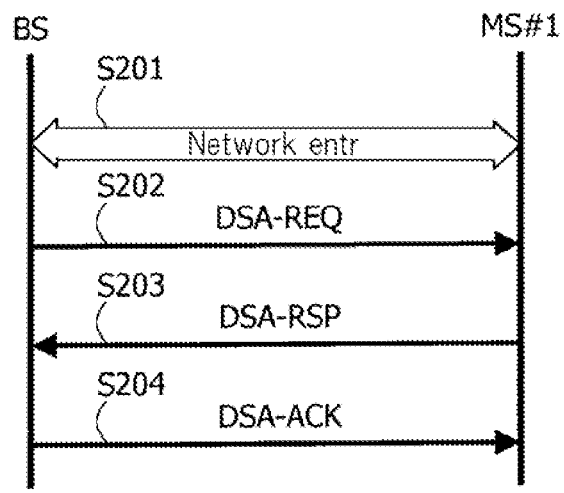
FIG. 5 is a flow chart describing an exemplary operation from a network entry process to a service flow generation process in the radio communication system shown in FIG. 4.

First of all, with reference to FIG. 5, an operation performed until a service flow is generated between the BS and one of MS#1~#3 will be described. In this part, the case in which a service flow is generated between the BS and the MS#1 will be exemplified.

First, the BS performs a network entry process that causes the MS#1 to enter the ASN (Access Service Network) and CSN (Connectivity Service Network) (not shown) (at step S201).

After the BS completes the network entry process, the BS enters the service flow generation process.

In the service flow generation process, the BS transmits to the MS#1 a DSA (Dynamic Service Addition)-REQ (Request) message that includes additional information (for example, information about the minimum reserved traffic rate for the MS#1) that is necessary when a service is provided to the MS#1 (at step S202).

After receiving this message, the MS#1 transmits to the BS a DSA-RSP (Response) message as a response to the DSA-REQ message (at step S203). If the MS#1 needs to change the additional information designated by the BS, the MS#1 sends back to the BS the DSA-RSP message including the additional information to be changed. If the MS#1 does not need to change the additional information, the MS#1 sends back to the BS only the DSA-RSP message.

Thereafter, the BS transmits to the MS#1 a DSA-ACK (Acknowledgement) message that denotes that the BS has completely received the DSA-RSP message (at step S204).

Until now, the service flow process has been completed.

[Adaptive Modulation Operation Involving Admission Control]

Figure 1:
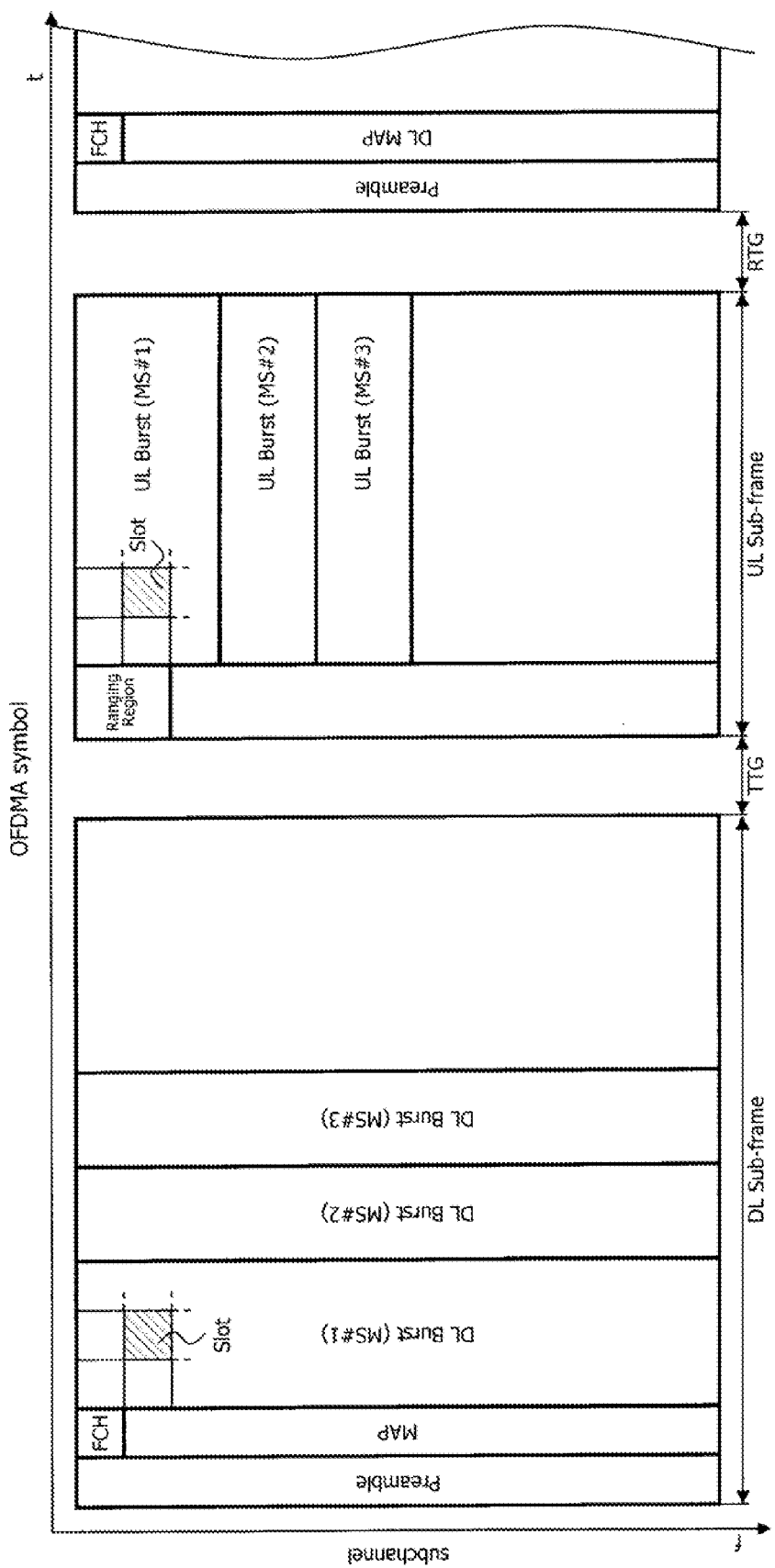
FIG. 1 is a schematic diagram describing a frame structure of a WiMAX.
Figure 2:
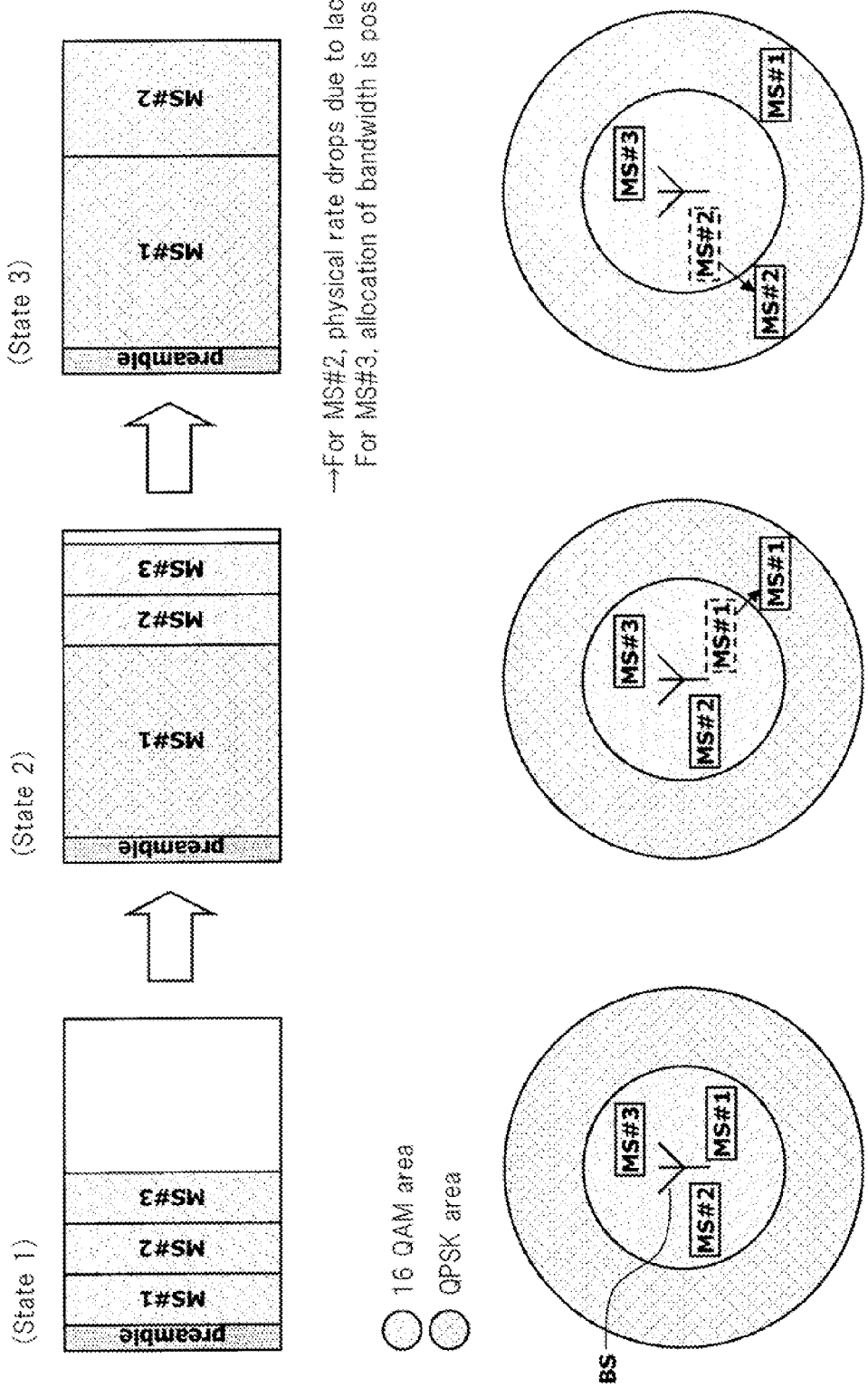
FIG. 2 is a schematic diagram describing an exemplary adaptive modulation operation in a related art radio communication system.
Figure 3:
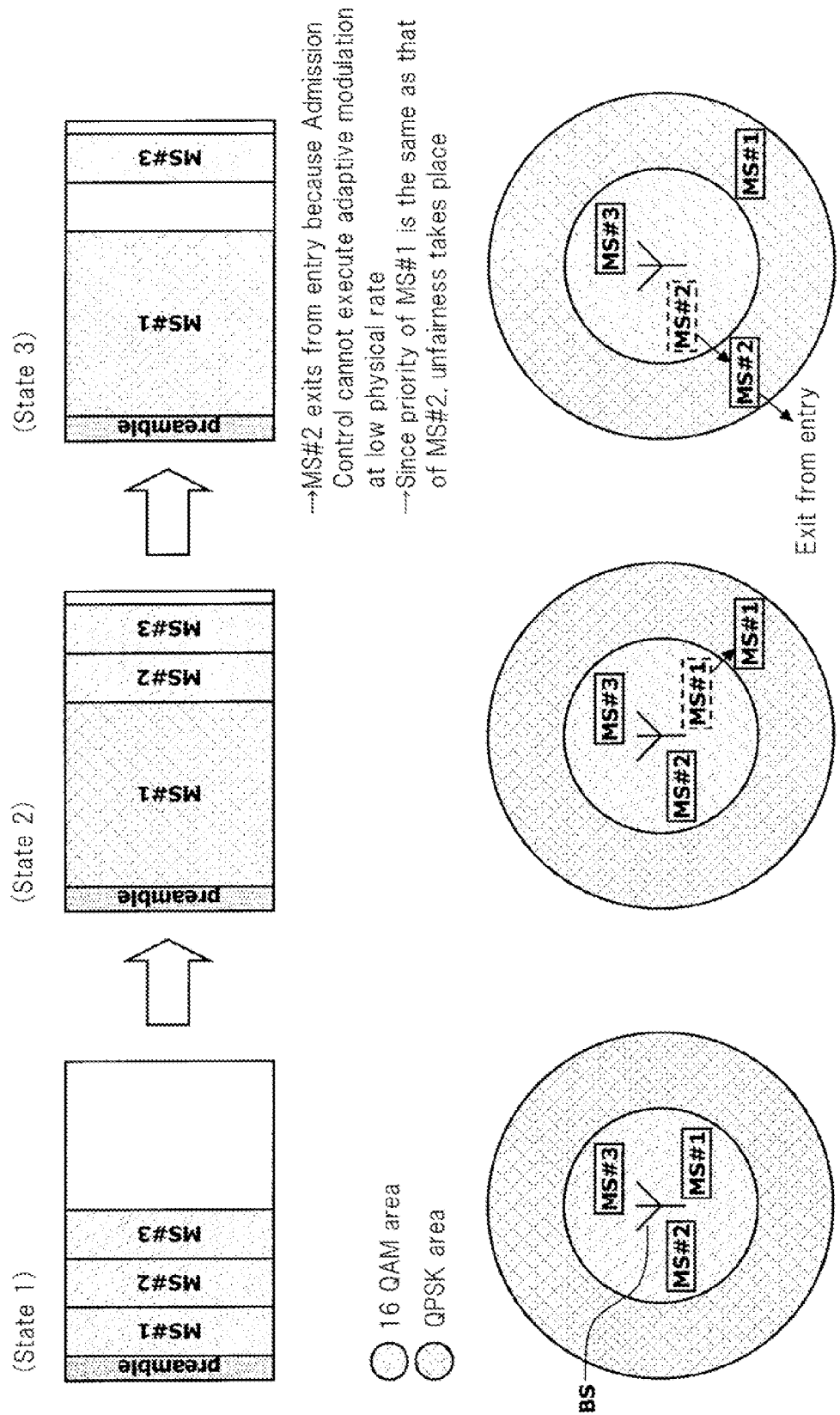
FIG. 3 is a schematic diagram describing another exemplary adaptive modulation operation in the related art radio communication system.

Next, with reference to FIG. 6, the adaptive modulation operation involving the Admission Control will be described. In FIG. 6, the relationship of positions in the lower illustrations is the same as those in FIG. 2 and FIG. 3.

Referring to FIG. 6, it is assumed that the MS#1~MS#3 are located in the 16 QAM area in the initial state (state 1).

At this point, the BS has completed the foregoing service flow generation process with each of the MS#1~MS#3.

Thus, minimum physical rate decision unit 13 computes an allowable throughput that represents an allocatable throughput for each MS for each of combinations of modulation systems and code rates in the case in which the BS accommodates an estimated accommodation number of MSs in advance, compares the allowable throughput of each of the MS#1~MS#3 and the minimum reserved traffic rate when the service flow generation process has been completed, and decides the minimum physical rate based on the compared results.

In this part, with reference to FIG. 7, the method that decides the minimum physical rate will be described in detail.

In this case, it is assumed that the minimum physical rate is decided under the conditions that follow.

(Conditions)
Frequency bandwidth used in radio communication system=10 MHz
Estimated accommodation number of MSs=4 units
DL:UL ratio that is ratio of symbols in DL sub-frame and UL sub-frame=29:18
Minimum reserved traffic rate of DL provided for MS under control=1 Mbps
Minimum reserved traffic rate of UL provided to MS under control=500 kbps First of all, minimum physical rate decision unit 13 obtains the number of slots that can be used in the DL sub-frame and the UL sub-frame.

In this case, it is assumed that 13 symbols×30 sub-channels, 390 slots, of the DL sub-frame and 5 symbols×35 sub-channels, 175 slots, of the UL sub-frame can be allocated to bandwidths of the MSs.

Thereafter, minimum physical rate decision unit 13 obtains the maximum number of slots per MS in the case in which the BS accommodates the estimated accommodation number of MSs, four MSs.

In this case, since the number of slots that can be used in the DL sub-frame is 390, the maximum number of slots allocated to each MS becomes 97 slots. On the other hand, since the number of slots that can be used in the UL sub-frame is 175, the maximum number of slots allocated to each MS becomes 43 slots.

Then, minimum physical rate decision unit 13 computes the allowable throughput for each of combinations of modulation systems and code rates in the case in which the BS accommodates the estimated accommodation number of MSs, four MSs.

In this case, assuming that the number of bytes that can be allocated to one slot for each of combinations=A and the number of frames transmitted per second between the BS and each MS=200 and that the maximum number of slots per MS obtained above is used, the allowable throughput of each of the DL and UL is computed according to Formula (1) that follows. In the formula, "8" is a coefficient used to convert bytes into bits.

$$\text{(Maximum number of slots per MS)} \times A \times 200 \times 8 \quad (1)$$

Thereafter, minimum physical rate decision unit 13 compares the allowable throughput of each of combinations and the minimum reserved traffic rate of each of the DL and UL and decides the minimum physical rate based on the compared results.

In this case, the minimum reserved traffic rate of the DL is 1 Mbps. The minimum allowable throughput that satisfies the minimum reserved traffic rate is an allowable throughput of the QPSK 3/4. Thus, the minimum physical rate of the DL is decided to be the physical rate of the QPSK 3/4. Likewise, the minimum reserved traffic rate of the UL is 500 kbps and the minimum allowable throughput that satisfies the minimum reserved traffic rate is an allowable throughput of the QPSK 3/4. Thus, the minimum physical rate of the UL is also decided to be the physical rate of the QPSK 3/4.

Minimum physical rate decision unit 13 may monitor the number of MSs actually accommodated in the BS and decide the estimated accommodation number of MSs based on the monitored result. For example, it can be contemplated that the number of MSs is periodically monitored and the average number of MSs in a predetermined duration may be decided to be the estimated accommodation number of MSs.

Thus, bandwidths that become necessary if the Admission Control takes place for the MS#1~MS#3 can be estimated in advance using the minimum physical rate decided by minimum physical rate decision unit 13 as shown in FIG. 6.

Referring to FIG. 6 again, it is assumed that the MS#1 has moved from the 16 QAM area to the QPSK area (state 2).

Then, postulating that the adaptive modulation is executed at the minimum physical rate decided by minimum physical rate decision unit 13 for the MS#1, Admission Control unit 14 executes the Admission Control.

The minimum physical rate postulated at this point does not uniformly become the physical rate of the QPSK 1/2, but becomes the minimum physical rate according to the minimum reserved traffic rate of the MS#1. Thus, for the MS#1, a bandwidth according to the minimum physical rate is reserved and a service can be provided to the MS#1 postulated on the basis of the minimum physical rate.

On the other hand, if the minimum physical rate is greater than the physical rate of the QPSK 1/2, the number of slots that necessitates reservation of a bandwidth of the MS#1 is not greater than the number of slots in the case of the QPSK 1/2. Thus, even if adaptive modulation is performed for the MS#1, it can be accommodated. In addition, the MS#1 can be prevented from occupying the bandwidths of the DL sub-frame and UL sub-frame.

Then, it is assumed that the MS#2 has moved from the 16 QAM area to the QPSK area (state 3).

Then, postulating that the adaptive modulation is executed for the MS#2 at the minimum physical rate decided by minimum physical rate decision unit 13, Admission Control unit 14 of the BS executes the Admission Control.

Like the case of the MS#1, the minimum physical rate postulated at that point does not uniformly become the physical rate of the QPSK 1/2, but the minimum physical rate according to the minimum reserved traffic rate of the MS#2. Thus, for the MS#2, a bandwidth according to the minimum physical rate is reserved and a service can be permitted to the MS#2 postulated on the basis of the minimum physical rate.

If the minimum physical rate is greater than the physical rate of the QPSK 1/2, like the case of the MS#1, the number of slots that necessitates reservation of the bandwidth for the MS#2 does not become greater than the number of slots in the case of the QPSK 1/2. In addition, in state 2, the MS#1 does not occupy the bandwidths of the DL sub-frame and UL sub-frame. Thus, even if the adaptive modulation is performed for the MS#2, it can be accommodated and no unfairness takes place between the MS#1 and MS#2. In addition, since the MS#1 and MS#2 can be prevented from occupying the bandwidths of the DL sub-frame and UL sub-frame, a bandwidth can be also allocated to the MS#3.

As described above, postulating that the BS computes the allowable throughput of each MS in the case in which the BS accommodates the estimated accommodation number of MSs for each of combinations of modulation systems and code rates in advance, decides the minimum physical rate for an MS to be controlled by the Admission Control based on the compared results of the minimum reserved traffic rate and allowable throughput of the MS, and executes the adaptive modulation, the Admission Control is executed.

The minimum physical rate postulated in the Admission Control does not uniformly become the physical rate of the QPSK 1/2, but becomes the minimum physical rate according to the minimum reserved traffic rate of the MS under control.

Thus, for the MS under control, a bandwidth according to the minimum physical rate is reserved and a service can be provided to the MS postulated on the basis of the minimum physical rate.

In addition, when the minimum physical rate is greater than the physical rate of the QPSK 1/2, the number of slots that necessitates reservation of a bandwidth for the MS under control does not become greater than the number of slots for the QPSK 1/2. Thus, even if the adaptive modulation is performed for the MS under control, it can be prevented from occupying the bandwidths of the DL sub-frame and UL sub-frame.

Moreover, since an MS under control can be prevented from occupying the bandwidths of the DL sub-frame and UL sub-frame, if an MS that necessitates a high physical rate is accommodated and the Admission Control is executed, the likelihood of occurrence of unfairness in which bandwidths of other MSs are restricted, the adaptive modulation cannot be performed, and other MSs exit from the entry can be reduced. In addition, since the bandwidths of the DL sub-frame and UL sub-frame have excessive free spaces, they can be allocated to MSs that belong to a QoS class such as the BE (Best Effort Service) that does not necessitate reservation of a bandwidth.

Until now, with reference to the embodiment, the present invention has been described. However, it should be understood by those skilled in the art that the structure and details of the present invention may be changed in various manners without departing from the scope of the present invention.

For example, the method performed in the BS according to the present invention can be applied to a computer executable program. In addition, the program may be stored in a storage medium and provided to the outside through a network.

The invention claimed is:

1. A radio communication system of comprising: a terminal and a base station that executes an admission control that determines whether or not said base station can accommodate a terminal that is the control target, from among terminals for which said base station executes an adaptive modulation that adaptively changes combinations of modulation systems and code rates, that belongs to a QoS (Quality of Service) class that necessitates reservation of a bandwidth when said base station execute said adaptive modulation, wherein said base station includes:

a decision unit that computes, based on a ratio of a number of symbols in a downlink subframe to a number of symbols in an uplink subframe for a predetermined bandwidth, a minimum downlink reserved traffic rate, and a minimum uplink reserved traffic rate, an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and a control unit that executes said admission control for said terminal that is the control target postulating that the adaptive modulation is executed for said terminal that is the control target at the minimum physical rate decided by said decision unit, wherein said decision unit identifies a combination that allows for a minimum allowable throughput that satisfies said minimum reserved traffic rate from among said combinations and decides a physical rate of the identified combination as said minimum physical rate.

2. The radio communication system as set forth in claim 1, wherein said control unit determines that said base station can accommodate said terminal that is the control target when a bandwidth according to the minimum physical rate decided by said decision unit can be allocated to said terminal that is the control target.

3. The radio communication system as set forth in claim 1, wherein said decision unit monitors the number of terminals actually accommodated in said base station and decides said predetermined accommodation number of terminals based on the monitored result.

4. A base station that executes an admission control that determines whether or not said base station can accommodate a terminal that is the control target, from among terminals for which said base station executes an adaptive modulation that adaptively changes combinations of modulation systems and code rates, that belongs to a QoS class that necessitates reservation of a bandwidth when said base station execute said adaptive modulation,
wherein said base station includes:
a decision unit that computes, based on a ratio of a number of symbols in a downlink subframe to a number of symbols in an uplink subframe for a predetermined bandwidth, a minimum downlink reserved traffic rate, and a minimum uplink reserved traffic rate, an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and
a control unit that executes said admission control for said terminal that is the control target postulating that the adaptive modulation is executed for said terminal that is the control target at the minimum physical rate decided by said decision unit,
wherein said decision unit identifies a combination that allows for a minimum allowable throughput that satisfies said minimum reserved traffic rate from among said combinations and decides a physical rate of the identified combination as said minimum physical rate.

5. The base station as set forth in claim 4, wherein said control unit determines that said base station can accommodate said terminal that is the control target when a bandwidth according to the minimum physical rate decided by said decision unit can be allocated to said terminal that is the control target.

6. The base station as set forth in claim 4, wherein said decision unit monitors the number of terminals actually accommodated in said base station and decides said predetermined accommodation number of terminals based on the monitored result.

7. A radio communication method for a base station that executes an admission control that determines whether or not said base station can accommodate a terminal that is the control target, from among terminals for which said base station executes an adaptive modulation that adaptively changes combinations of modulation systems and code rates, that belongs to a QoS class that necessitates reservation of a bandwidth when said base station execute said adaptive modulation, comprising:
a decision step that computes, based on a ratio of a number of symbols in a downlink subframe to a number of symbols in an uplink subframe for a predetermined bandwidth, a minimum downlink reserved traffic rate, and a minimum uplink reserved traffic rate, an allowable throughput of each terminal for each of said combinations in the case in which said base station accommodates a predetermined accommodation number of terminals in advance, compares a minimum reserved traffic rate of the terminal that is the control target and said allowable throughput, and decides a minimum physical rate at which the bandwidth is reserved based on the compared results; and
a control step that executes said admission control for said terminal that is the control target postulating that the adaptive modulation is executed for said terminal that is the control target at the minimum physical rate that has been decided,
wherein said decision step identifies a combination that allows for a minimum allowable throughput that satisfies said minimum reserved traffic rate from among said combinations and decides a physical rate of the identified combination as said minimum physical rate.

8. The radio communication method as set forth in claim 7, wherein said control step determines that said base station can accommodate said terminal that is the control target when a bandwidth according to the minimum physical rate that has been decided can be allocated to said terminal that is the control target.

9. The radio communication method as set forth in claim 7, wherein said decision step monitors the number of terminals actually accommodated in said base station and decides said predetermined accommodation number of terminals based on the monitored result.

* * * * *